United States Patent Office 3,553,171
Patented Jan. 5, 1971

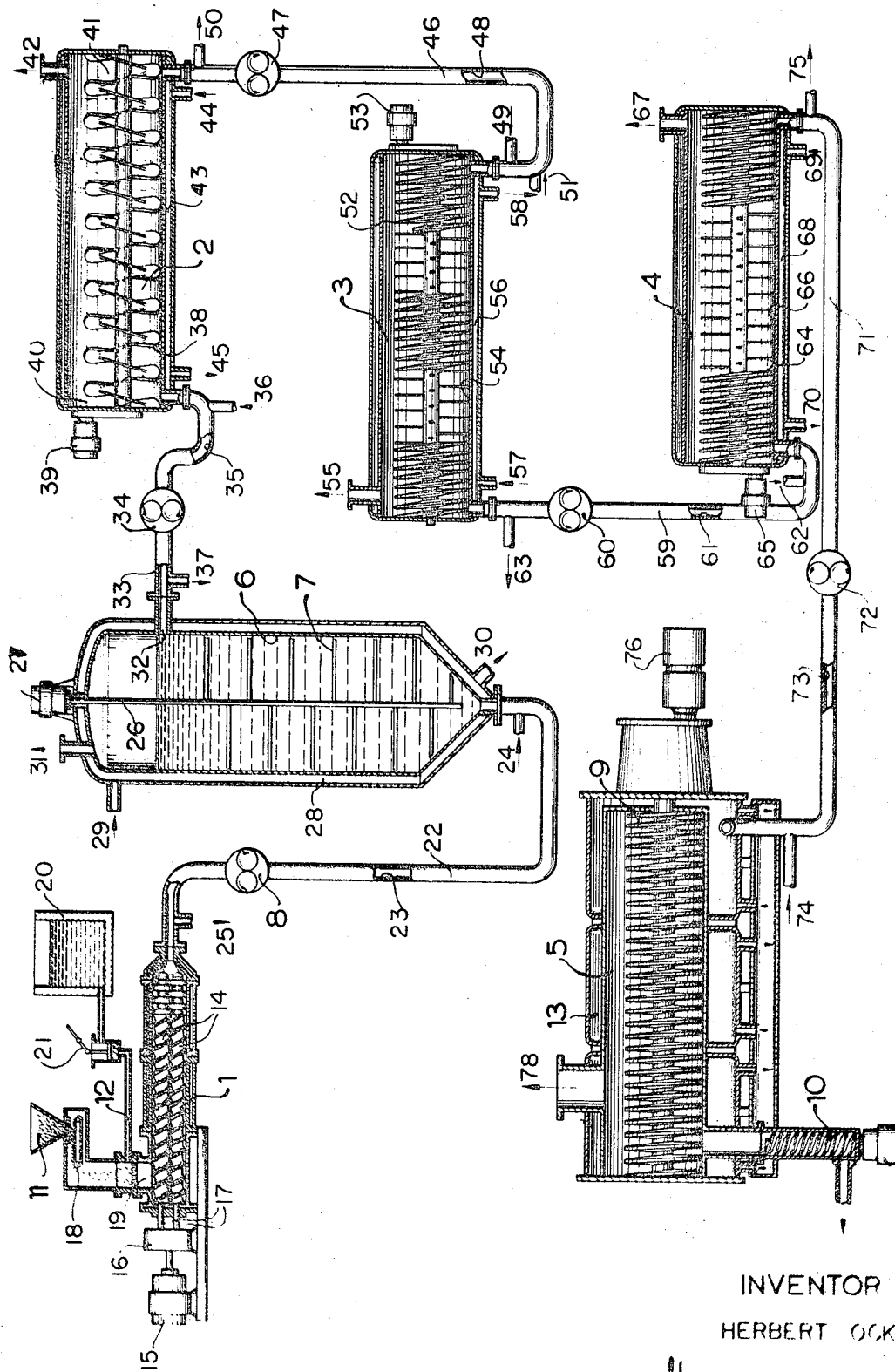

3,553,171
PROCESS FOR PRODUCTION OF DIRECTLY SPIN-
NABLE POLY(ETHYLENE TEREPHTHALATE)
Herbert Ocker, Leonberg, Germany, assignor to Werner
& Pfleiderer, Stuttgart-Feuerbach, Germany, a corporation of Germany
Filed Oct. 9, 1968, Ser. No. 766,236
Claims priority, application Germany, Oct. 24, 1967,
W 45,035
Int. Cl. C08g 17/01
U.S. Cl. 260—75         6 Claims

ABSTRACT OF THE DISCLOSURE

A process and installation therefor to produce a spinnable polyester composition and is particularly characterized in that pulverized dimethylterephthalate (DMT) and ethylene glycol are first mixed to form a homogeneous paste (preferably in a screw extruder with meshing screws and having a very short dwell time), then the paste is melted and heated to its ester-exchange temperature and is agitated at high speed (preferably using twin paddle screws with pilgrim-step or reciprocating step motions). After the addition of a suitable catalyst, the mixture is introduced to a series of screw-conveyor type reactors at a temperature of about 280 degrees Celsius (536 degrees Fahrenheit) and at pressures decreasing from about 60 torrs absolute down to from 0.1 to 0.3 torr absolute with the glycol content from 1% to 3% and the viscosity from 100 to 300 poises in the last reactor.

BACKGROUND

Among various prior art processes for producing a spinnable polyester composition, the latest process features pulverized DMT which is discharged from a hopper into a tube vibrator and thereafter continues in turn to a melting vessel and then to a cascade. Preheated ethylene glycol is introduced from proportioning pumps into the cascade. Ester exchanging takes place in the cascade which comprises several cells provided with agitators. Leaving the cascade, the product flows to a series of reactor vessels which are equipped with vacuum pumps for degassing. Some of these reactors are also furnished with agitators. A screw conveyor discharges the product for further processing. The afore-described plant according to the latest prior art also includes other vessels, as well as pumps, piping and auxiliaries. The installation for this process is extremely expensive structurally.

The primary disadvantage of the afore-described prior-art process and installation (as well as of other known processes and installations for production of a spinnable polyester composition) was that reliable dwell times in the individual process stages could not be maintained; therefore, in many instances the quality of the final product could not be assured. Variations in dwell times and consequent variations in heating in the various process stages resulted in formation of entirely different molecule chains giving rise to considerable variations in the polymeric finished product. Even the application of extensive control measures did not achieve satisfactory results.

STATEMENT

This invention copes with the foregoing disadvantages of the prior art in a novel and facile way. One advantage of this invention is that a homogeneous paste of DMT and ethylene glycol, instead of pulverized DMT, enters the melting and heating apparatus.

A further advantage is that pulverized DMT and glycol are mixed in a screw extruder with meshing screws and flow after a very short dwell time as homogeneous paste to the melting and heating apparatus.

A further advantage is that the melted and heated mixture of DMT and ethylene glycol are promptly carried to a high speed agitator for ester exchange.

A further advantage is that after a catalyst addition the still liquid product reaches a single or twin screw conveyor type reactor in which condensation begins at approximately 280 degrees Celsius (536 degrees Fahrenheit) and about 60 torrs absolute and that condensation continues in a second screw conveyor type reactor at approximately 280 degrees Celsius and 1 to 10 torrs absolute and that with a viscosity of about 100 to 300 poises absolute and with an ethylene glycol content of from 1 to 3% the product enters a third screw conveyor type reactor for final condensation at approximately 280 degrees Celsius and 0.1 to 0.3 torr absolute.

A further advantage is that by selective adjustment of viscosity between 2,000 and 12,000 poises absolute, the product flow can be directed to subsequent treatments such a dyeing, spinning beam and the like.

An important variation of this invention is to raise the product to a viscosity of from 1,000 to 2,000 poises absolute before it enters the third reactor followed by after-condensation in the third reactor at above 8,000 poises absolute.

Process equipment according to this invention takes especially advantageous forms. Melting and heating equipment may comprise either a melting vessel provided with an agitator or a screw conveyor heat exchanger (hollow screw shaft). The high speed agitator should preferably comprise a one or two shaft paddle screw with pilgrim step or reciprocating step motion.

Another advantage is that the first and second reactors are designed so that accurate scraping or stripping of the product from inside walls can be assured.

Another advantage is that the third reactor for final condensation has a double shaft screw conveyor with uni-directional rotation of the screws whereby they have a self-cleansing profile of engagement.

DRAWING

The accompanying drawing is a simplified representation of an installation for carrying out the process according to this invention.

PREFERRED EMBODIMENTS

As seen from the drawing, pulverized DMT and liquid ethylene glycol are fed to screw extruder 1 which has meshing screws 14 driven by motor 15 through transmission 16 and twin shafts 17. Pulverized DMT is fed from hopper 11 by means of endless conveyor 18 to inlet port 19. A supply of liquid ethylene glycol is housed in reservoir 20 and is delivered via line 12 to inlet port 19 with flow control thereof provided by regulator 21. After a very short time, DMT and ethylene glycol exit screw extruder 1 as a homogeneous paste and pass by means of pump 8 via line 22 to a melting and heating apparatus shown as vessel 6. It should be understood that the melting and heating apparatus could also be a screw conveyor heat exchanger (hollow screw shaft). Line 22 is provided with heating jacket 23 having steam inlet 24 and steam outlet 25.

In melting and heating vessel 6 the homogeneous paste is heated to its ester exchange temperature so that ester exchange commences with a consequent release of gaseous methanol. Agitator 7 stirs the mixture and is driven from shaft 26 by motor 27. Vessel 6 is also provided with heating jacket 28 having steam inlet 29 and steam outlet 30. Gaseous methanol exits via port 31.

The liquid product is carried from vessel 6 through exit 32 and line 33 to high speed agitator 2 for ester exchange and further heating accompanied by release of more gaseous methanol. Line 33 has pump 34 which is typical of pumps between elements of equipment in this installation in that it meters product to the succeeding element of equipment, in the case of pump 34 high speed agitator 2. Line 33 is further provided with heating jacket 35 having steam inlet 36 and steam outlet 37. High speed agitator 2 comprises preferably a two shaft pair of paddle screws 38 driven by motor 39 and having a pilgrim step (forward and backward) or reciprocating step motion. Inlet ends 40 and outlet ends 41 of paddle screws 38 have conveying pitches while the mixing portions of the paddle screws are mounted tangentially to each other. Gaseous methanol exits high speed agitator 2 via port 42 and steam enters heating jacket 43 via inlet 44 and exits through outlet 45. The product is removed from high speed agitator 2 through line 46 which is provided with pump 47 as well as heating jacket 48 with steam inlet 49 and steam outlet 50.

A catalyst such as magnesium, lithium methylate 0.01 to 0.015%, zinc borate 0.2%, lead dioxide, antimony trioxide or cesium oxide is added at 51 and then the still liquid product is introduced to single or twin shaft screw conveyor type reactor 3 in which condensation polymerization begins at approximately 280 degrees Celsius (536 degrees Fahrenheit) and about 60 torrs absolute. It is of particular advantage to design first reactor 3 so that screw conveyors 52 driven by motor 53 accurately scrape or strip the product from inside wall 54. Gaseous methanol is vented from port 55 and heating jacket 56 is provided with steam inlet 57 and steam outlet 58.

The condensation polymerization (or polycondensation) continues in second screw conveyor type reactor 4 at 280 degrees Celsius and 1 to 10 torrs absolute. The product passes from first reactor 3 to second reactor 4 through line 59 which is provided with pump 60 as well as heating jacket 61 having steam inlet 62 and steam outlet 63. As in first reactor 3 it is of particular advantage to design second reactor 4 so that screw conveyors 64 driven by motor 65 accurately scrape or strip the product from inside wall 66. Gaseous methanol is vented from port 67 and heating jacket 68 is provided with steam inlet 69 and steam outlet 70.

With a viscosity of about 100 to 300 poises and an ethylene glycol content of 1 to 3%, the product enters third screw conveyor type reactor 5 for final polycondensation at 280 degrees Celsius and 0.1 to 0.3 torr absolute. By selective adjustment from 2,000 to 12,000 poises, the product can be subjected to subsequent treatments such as dyeing, spinning beam, etc. The product is conveyed from second reactor 4 to third reactor 5 by way of line 71 which is provided with pump 72 as well as heating jacket 73 with steam inlet 74 and steam outlet 75. Reactor 5 has twin shaft screw conveyors which are driven by motor 76 in unidirectional rotation and with self-cleansing profiles of engagement. Screw conveyor 10, driven by motor 77, discharges the product for further processing. Vent domes 13 and outlet port 78 are also formed in reactor 5. The representation of more process detail and equipment known to the art are not considered essential for a proper understanding of this invention; accordingly this process detail and equipment have been omitted.

An important embodiment of this invention in certain cases is to raise the product to from 1,000 to 2,000 poises before it enters third reactor 5 and following this by afterpolycondensation in reactor 5 at above 8,000 poises.

What I claim is:

1. A process for manufacturing a spinnable polyester composition and comprising the steps of:
   (a) mixing pulverized dimethylterephthalate and ethylene glycol in a screw conveyor to form a homogeneous paste,
   (b) melting the paste and heating it to its ester-exchange temperature,
   (c) agitating the product of step (b) for ester exchange,
   (d) adding a suitable catalyst to the product of step (c),
   (e) introducing the product of step (d) to a plurality of screw-conveyor type reactors for polycondensation at a temperature of about 280 degrees Celsius and at pressures progressively reducing from about 60 torrs absolute to from 1 to 10 torrs absolute,
   (f) introducing the product of step (e) with a viscosity of from 100 to 300 poises and an ethylene glycol content of 1 to 3% to another screw-conveyor type reactor for final polycondensation at about 280 degrees Celsius and 0.1 to 0.3 torr absolute.

2. The process of claim 1 and selectively adjusting viscosity of the product of step (f) between 2,000 and 12,000 poises.

3. The process of claim 2 and accompanying each of steps (b), (c), (e) and (f) with withdrawal of methanol.

4. A process for manufacturing a spinnable polyester composition and comprising the steps of:
   (a) mixing pulverized dimethylterephthalate and ethylene glycol in a meshing-screw extruder with a very short dwell time to form a homogeneous paste,
   (b) melting the paste and heating it to its ester-exchange temperature,
   (c) agitating the product of step (b) for ester exchange,
   (d) adding a suitable catalyst to the product of step (c),
   (e) introducing the product of step (d) to a first screw-conveyor type reactor for polycondensation at a temperature of about 280 degrees Celsius and a pressure of about 60 torrs absolute,
   (f) introducing the product of step (e) to a second screw-conveyor type reactor for polycondensation at a temperature of about 280 degrees Celsius and 1 to 10 torrs absolute,
   (g) introducing the product of step (f) with a viscosity of from 100 to 300 poises and an ethylene glycol content of 1 to 3% to a third screw-conveyor type reactor for final polycondensation at about 280 degrees Celsius and from 0.1 to 0.3 torr absolute.

5. The process of claim 4 and selectively adjusting viscosity of the product of step (g) between 2,000 and 12,000 poises.

6. A process for manufacturing a spinnable polyester composition and comprising the steps of:
   (a) mixing pulverized dimethylterephthalate and ethylene glycol in a meshing-screw extruder with a very short dwell time to form a homogeneous paste,
   (b) melting the paste and heating it to its ester-exchange temperature,
   (c) agitating the product of step (b) for ester exchange,
   (d) adding a suitable catalyst to the product of step (c),
   (e) introducing the product of step (d) to a first screw-conveyor type reactor for polycondensation at a temperature of about 280 degrees Celsius and a pressure of about 60 torrs absolute,
   (f) introducing the product of step (e) to a second screw-conveyor type reactor for polycondensation at a temperature of about 280 degrees Celsius and a pressure of from 1 to 10 torrs absolute,
   (g) introducing the product of step (f) with a viscosity of from 1,000 to 2,000 poises and an ethylene glycol content of 1 to 3% to another screw-conveyor type reactor at about 280 degrees Celsius and 0.1 to 0.3 torr absolute followed by afterpolycondensation at above 8,000 poises.

References Cited

UNITED STATES PATENTS

| | | | |
|---|---|---|---|
| 2,964,391 | 12/1960 | Benson | 23—285 |
| 3,343,922 | 9/1967 | Zimmer et al. | 23—285 |
| 3,438,942 | 4/1969 | Scheller | 260—75 |

WILLIAM H. SHORT, Primary Examiner

M. GOLDSTEIN, Assistant Examiner

U.S. Cl. X.R.

23—260, 285